United States Patent
Kakhandiki et al.

(10) Patent No.: US 10,430,180 B2
(45) Date of Patent: Oct. 1, 2019

(54) SYSTEM AND METHOD FOR RESILIENT AUTOMATION UPGRADE

(71) Applicant: Automation Anywhere, Inc., San Jose, CA (US)

(72) Inventors: Abhijit Kakhandiki, San Jose, CA (US); Sridhar Gunapu, Santa Clara, CA (US)

(73) Assignee: Automation Anywhere, Inc., San Jose, CA (US)

(*) Notice: Subject to any disclaimer, the term of this patent is extended or adjusted under 35 U.S.C. 154(b) by 176 days.

(21) Appl. No.: 14/834,773

(22) Filed: Aug. 25, 2015

(65) Prior Publication Data

US 2016/0019049 A1    Jan. 21, 2016

Related U.S. Application Data

(63) Continuation-in-part of application No. 13/925,522, filed on Jun. 24, 2013, now Pat. No. 9,462,042, which is a continuation-in-part of application No. 12/787,469, filed on May 26, 2010, now Pat. No. 8,504,803.

(60) Provisional application No. 62/130,068, filed on Mar. 9, 2015.

(51) Int. Cl.
*G06F 8/65* (2018.01)
*G06F 8/658* (2018.01)
*G06F 8/71* (2018.01)

(52) U.S. Cl.
CPC ................... *G06F 8/658* (2018.02)

(58) Field of Classification Search
None
See application file for complete search history.

(56) References Cited

U.S. PATENT DOCUMENTS

| 5,949,999 | A | * | 9/1999 | Song | G06F 11/3664 |
| | | | | | 714/E11.208 |
| 5,983,001 | A | | 11/1999 | Boughner et al. | |
| 6,133,917 | A | * | 10/2000 | Feigner | G06F 9/4446 |
| | | | | | 715/708 |

(Continued)

OTHER PUBLICATIONS

Tom Yeh, Tsung-Hsiang Chang, and Robert C. Miller, Sikuli: Using GUI Screenshots for Search and Automation, Oct. 4-7, 2009, 10 pages.*

(Continued)

*Primary Examiner* — Yongjia Pan
(74) *Attorney, Agent, or Firm* — Prasad IP, PC

(57) ABSTRACT

This invention generally relates to a process, system and computer code for enabling users to create adapters that enable application automation by collecting automation information; locate application controls and tracking changes between an older and a newer version of the application, such changes to include addition of one or more new data fields, removal of one or more data fields, change in data field type (i.e. type of data held in the field); change field layout; and change the underlying technology framework of the application; to present the changes using an exception management model to the user, so user can by way of example provide feedback in a visual instead of programmatic manner; store the changes, so as to make the adapters resilient to application changes and upgrades; and incorporating the changes to upgrade the application.

11 Claims, 14 Drawing Sheets

(56) References Cited

U.S. PATENT DOCUMENTS

| | | | |
|---|---|---|---|
| 6,282,709 B1* | 8/2001 | Reha | G06F 8/65 |
| | | | 717/175 |
| 6,389,592 B1* | 5/2002 | Ayres | G06F 8/68 |
| | | | 707/999.01 |
| 6,427,234 B1 | 7/2002 | Chambers et al. | |
| 6,442,754 B1* | 8/2002 | Curtis | G06F 8/61 |
| | | | 707/999.104 |
| 6,473,794 B1 | 10/2002 | Guheen et al. | |
| 6,496,979 B1 | 12/2002 | Chen et al. | |
| 6,580,440 B1* | 6/2003 | Wagner | G06F 9/451 |
| | | | 715/762 |
| 6,640,244 B1 | 10/2003 | Bowman-Amuah | |
| 6,704,873 B1 | 3/2004 | Underwood | |
| 6,898,764 B2* | 5/2005 | Kemp | G06F 8/71 |
| | | | 715/762 |
| 6,954,747 B1* | 10/2005 | Wang | G06F 8/71 |
| | | | 706/1 |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2* | 7/2009 | Powell, Jr. | G06F 8/36 |
| | | | 713/187 |
| 7,571,427 B2* | 8/2009 | Wang | G06F 8/71 |
| | | | 707/999.202 |
| 7,653,896 B2* | 1/2010 | Herdeg, III | G06F 9/45512 |
| | | | 715/704 |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2* | 10/2010 | Nasuti | G06F 11/3688 |
| | | | 717/124 |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2* | 3/2012 | Malcolm | G06F 11/3688 |
| | | | 717/122 |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,396,890 B2 | 3/2013 | Lim | |
| 8,438,558 B1* | 5/2013 | Adams | G06F 8/68 |
| | | | 717/168 |
| 8,443,291 B2 | 5/2013 | Ku et al. | |
| 8,464,240 B2* | 6/2013 | Fritsch | G06F 8/65 |
| | | | 717/168 |
| 8,498,473 B2* | 7/2013 | Chong | G06F 17/3025 |
| | | | 382/162 |
| 8,504,803 B2 | 8/2013 | Shukla | |
| 8,607,190 B2* | 12/2013 | Coldicott | G06F 8/10 |
| | | | 707/793 |
| 8,631,458 B1 | 1/2014 | Banerjee | |
| 8,682,083 B2* | 3/2014 | Kumar | G06K 9/6202 |
| | | | 382/218 |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,887,146 B2* | 11/2014 | Hido | G06F 8/65 |
| | | | 717/168 |
| 8,943,493 B2 | 1/2015 | Schneider | |
| 8,965,905 B2 | 2/2015 | Ashmore et al. | |
| 9,104,294 B2 | 8/2015 | Forstall et al. | |
| 9,152,694 B1* | 10/2015 | Padidar | G06F 17/30598 |
| 9,213,625 B1* | 12/2015 | Schrage | G06F 11/3688 |
| 9,256,419 B2* | 2/2016 | Mannarswamy | G06F 8/656 |
| 9,278,284 B2 | 3/2016 | Ruppert et al. | |
| 9,383,903 B2* | 7/2016 | Sivakumar | G06F 3/0484 |
| 9,424,167 B2* | 8/2016 | Lee | G06F 11/3664 |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,594,544 B2* | 3/2017 | Wang | G06F 8/38 |
| 9,621,584 B1 | 4/2017 | Schmidt et al. | |
| 9,946,233 B2 | 4/2018 | Brun et al. | |
| 2003/0033590 A1* | 2/2003 | Leherbauer | G06F 8/71 |
| | | | 717/122 |
| 2003/0101245 A1 | 5/2003 | Srinivasan et al. | |
| 2003/0159089 A1* | 8/2003 | DiJoseph | G06F 11/3664 |
| | | | 714/38.1 |
| 2004/0031027 A1* | 2/2004 | Hiltgen | G06F 8/65 |
| | | | 717/170 |
| 2004/0083472 A1 | 4/2004 | Rao et al. | |
| 2004/0098413 A1* | 5/2004 | Peng | G06F 17/30174 |
| 2004/0172526 A1 | 9/2004 | Tann et al. | |
| 2004/0210885 A1* | 10/2004 | Wang | G06F 8/71 |
| | | | 717/158 |
| 2004/0243994 A1 | 12/2004 | Nasu | |
| 2005/0188357 A1* | 8/2005 | Derks | G06F 11/3692 |
| | | | 717/124 |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2006/0271924 A1* | 11/2006 | Calcaterra | G06F 8/61 |
| | | | 717/168 |
| 2007/0101291 A1 | 5/2007 | Forstall et al. | |
| 2007/0112574 A1 | 5/2007 | Greene | |
| 2008/0005086 A1 | 1/2008 | Moore | |
| 2008/0028392 A1 | 1/2008 | Chen et al. | |
| 2008/0059504 A1* | 3/2008 | Barbetta | G06F 8/38 |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1* | 4/2009 | Milov | G06F 11/3688 |
| | | | 382/100 |
| 2009/0172814 A1 | 7/2009 | Khosravi et al. | |
| 2009/0199160 A1 | 8/2009 | Vaitheeswaran et al. | |
| 2009/0217309 A1* | 8/2009 | Grechanik | G06F 8/38 |
| | | | 719/328 |
| 2009/0249297 A1* | 10/2009 | Doshi | G06F 11/3672 |
| | | | 717/124 |
| 2009/0313229 A1 | 12/2009 | Fellenstein et al. | |
| 2009/0320002 A1* | 12/2009 | Peri-Glass | G06F 8/38 |
| | | | 717/131 |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0138015 A1 | 6/2010 | Colombo et al. | |
| 2010/0235433 A1 | 9/2010 | Ansari et al. | |
| 2011/0022578 A1 | 1/2011 | Fotev | |
| 2011/0040824 A1* | 2/2011 | Harm | G06F 9/45529 |
| | | | 709/203 |
| 2011/0145807 A1 | 6/2011 | Molinie et al. | |
| 2011/0197121 A1* | 8/2011 | Kletter | G06F 17/2211 |
| | | | 715/234 |
| 2011/0276568 A1 | 11/2011 | Fotev | |
| 2011/0276946 A1* | 11/2011 | Pletter | G06F 11/3688 |
| | | | 717/124 |
| 2011/0296528 A1* | 12/2011 | Shukla | G06F 9/4843 |
| | | | 726/25 |
| 2011/0302570 A1 | 12/2011 | Kurimilla et al. | |
| 2012/0042281 A1* | 2/2012 | Green | G06F 9/4448 |
| | | | 715/810 |
| 2012/0124062 A1 | 5/2012 | Macbeth et al. | |
| 2012/0330940 A1 | 12/2012 | Caire et al. | |
| 2013/0173648 A1* | 7/2013 | Tan | G06F 8/60 |
| | | | 707/758 |
| 2013/0290318 A1* | 10/2013 | Shapira | G06F 17/30598 |
| | | | 707/723 |
| 2014/0059535 A1* | 2/2014 | Gocek | G06F 8/60 |
| | | | 717/174 |
| 2014/0181705 A1* | 6/2014 | Hey | G06F 11/3672 |
| | | | 715/764 |

(56) References Cited

U.S. PATENT DOCUMENTS

| | | | | |
|---|---|---|---|---|
| 2015/0082280 | A1* | 3/2015 | Betak | G06F 11/3692 717/124 |
| 2015/0347284 | A1* | 12/2015 | Hey | G06F 11/3692 717/125 |
| 2015/0363294 | A1* | 12/2015 | Carback, III | G06F 8/37 717/132 |
| 2016/0019049 | A1 | 1/2016 | Kakhandiki et al. | |
| 2016/0078368 | A1 | 3/2016 | Kakhandiki et al. | |
| 2016/0162802 | A1* | 6/2016 | Chickering | G06N 99/005 706/12 |

OTHER PUBLICATIONS

Hugo Larochelle, Michael Mandel, Razvan Pascanu, Yoshua Bengio, Learning Algorithms for the Classification Restricted Boltzmann Machine, Mar. 2012, 27 pages. (Year: 2012).*

Al Sallami, Load Balancing in Green Cloud Computation, Proceedings of the World Congress on Engineering 2013 vol. II, WCE 2013, 2013, pp. 1-5 (Year: 2013).

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Yu et al., Deploying and managing Web services: issues, solutions, and directions, 36 pages (Year: 2008).

Zhifang et al., Test automation on mobile device, May 2010, 7 pages.

* cited by examiner

SYSTEM AND METHOD FOR RESILIENT AUTOMATION UPGRADE

CROSS-REFERENCE TO RELATED APPLICATIONS

This is a continuation-in-part of and claims the priority benefit under 35 USC § 119(e) provisional application 62/130,068, filed, Mar. 9, 2015, entitled System and Method for Upgrade Resilient Automation, and under 35 USC § 120 for U.S. patent application Ser. No. 13/925,522, filed Jun. 24, 2013, entitled System and Method For Enabling Application Discovery by Automation Needs, and the priority benefit under 35 USC § 120 for U.S. Pat. No. 8,504,803, filed May. 26, 2010 System and Method For Creating and Executing Portable Software, the entire disclosures of which are hereby incorporated by reference herein.

FIELD OF THE INVENTION

The present invention relates to information technology software that enables application automation processes that persist throughout application version upgrades.

BACKGROUND OF THE INVENTION

End users of Web task, legacy applications, Apple (Apple is a registered trade mark of Apple, Inc.) or Windows (Windows is a registered trade mark of Microsoft Corporation) based operating systems create few automated processes, that is a series of steps that a user desires to execute on a computer (often at pre-defined time or with a click of a button or a mouse). These software processes could be of any type and for any purpose, e.g., business, IT, or requirements to validate software behavior, etc. In some instances, the user desires to create a task, assign properties to the task and to run the task on a local or a remote computer. Desirable applications may be the creation of adapters that enable application automation by collecting automation information; the locating of application controls and tracking changes between an older and newer version of an application; presenting the changes using an exception management model to a user, so that the user can provide feedback in a visual, instead of programmatic manner; storing and incorporating the changes so as to make the adapters resilient to application changes and upgrades. Unfortunately, a process that achieves this complex series of steps has not been available until now.

In addition to making the necessary connection to complete a process, it is instructive to a user that they see the interactions of the various resources and the relationships between a user's applications and other applications. Such visualization would allow the user to employ other applications more efficiently or assist in the discovery of other applications a user can derive data from.

SUMMARY OF THE INVENTION

The invention herein discloses a computerized method operable in a computer system to create adapters that enable application automation, the method causing the computer system to execute the steps including: (1) collecting automation information related to a computer application; (2) locating one or more application controls; (3) tracking changes between an older and a newer version of the application, the changes including one or more of: (a) an addition of one or more new data fields, (b) a removal of one or more data fields; (c) a change in data field type, (d) a field layout; (e) an underlying technology framework of the application; and (f) presenting the changes, utilizing an exception management model, employed by a user, whereby the user provides a feedback; (4) storing the changes, whereby the adapters are resilient to application changes and upgrades; (5) and incorporating the changes to upgrade the application.

One embodiment of the invention is a computer method for creating adapters that enable new and updated applications or versions thereof including the steps of: (1) opening a new application related to an existing application; (2) navigating to a specific display screen; (3) generating a screen fingerprint of the existing application; (4) checking existing versions; (5) determining if the screen exists; and if (a) the screen does not exist, then (6) serializing the screen for storing into a repository and then exiting the method; otherwise if (b) the screen exists, then (7) generating semantic differences between the new application and the existing application; (8) finding closest screen match; (9) presenting the differences to a user with a probability score dependent on the differences; (10) providing feedback from a user; (11) updating a semantic model; (12) serializing the screen repository and exiting method.

Another embodiment of the invention is a method for generating updated programming content, for an existing application having an adapter, in order to operate with a new version of a related application, including the steps of (1) extracting source field data from existing application and target field metadata from the new version of the related application; (2) storing the source field data from existing application and target field metadata from the new version of the related application to a process repository; (3) transforming and transferring the stored data from steps (2) to the adapter; (4) updating the existing adapter to work with the new version of the related application, utilizing the data obtained by the adapter in step (3).

Another embodiment of the invention is a non-transitory computer-readable medium having stored thereon computer-readable instructions for creating adapters that enable new and updated applications including the steps of: (1) opening an new application related to an existing application; (2) navigating to a specific display screen; (3) generating a screen fingerprint of the existing application; (4) checking existing versions; (5) determining if the screen exists and if (a) the screen does not exist, then (6) serializing the screen to repository and exiting method; otherwise (b) if the screen exists, then (7) generating semantic differences between the new application and the existing application; (8) finding closest screen match; (9) presenting the differences to a user with a probability score dependent on the differences; (10) providing feedback from a user; (11) updating a semantic model; and (12) serializing the screen repository and exiting method.

DESCRIPTION OF PREFERRED EMBODIMENT

The present invention will now be described more fully hereinafter with reference to the accompanying drawings, in which preferred embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In what follows, application software refers to all the computer software that causes a computer to perform useful tasks beyond the running of the computer itself. The disclosure relates to software, which manages and integrates a computer's capabilities, such as the generation of adapters to enable application automation by exposing operations that can be automated, in the form of an API that can be leveraged by various automation engines including Automation Anywhere (found at www.automationanywhere.com). One object of the invention is to assist in automatically upgrading older version applications to newer versions, which in turn serves the user.

Figure 1:
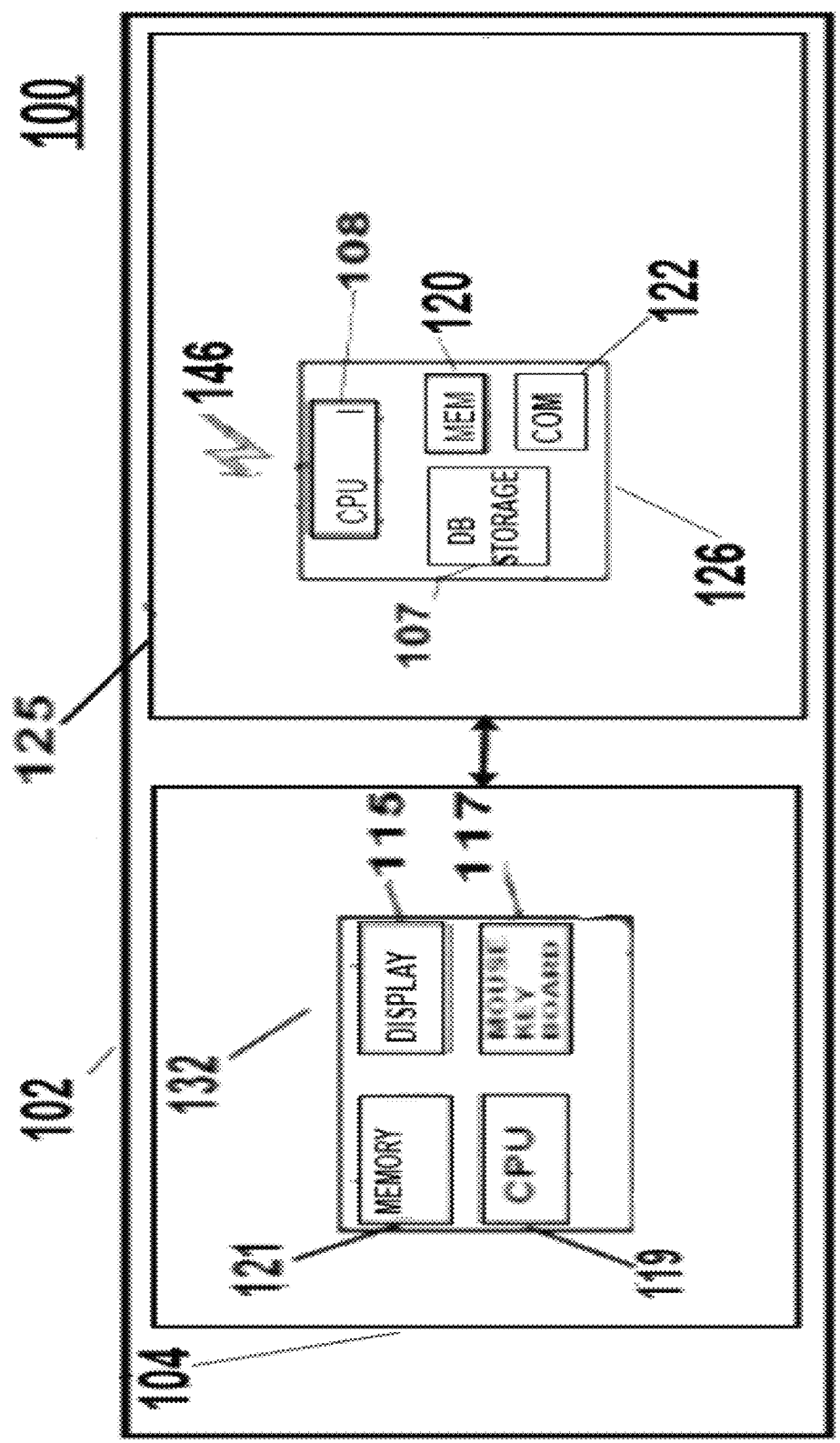
FIG. 1 shows a system for creating one or more new application execution files in accordance with an embodiment of the present invention.

FIG. 1 represents a system 100, which operates a process 300 (see, FIG. 3), where a user at an origin can create software processes, in one computer environment that can be ported to one or more remotely situated computers for obtaining a resource needed to accomplish a task such as by way of example and not limitation, the upgrades to older versions of an application to new versions of an application. System 100 includes at least one user computer 104 having at least one central processing unit (CPU) 119, which typically is the processor for an operating system and an application resident in memory 121 that contains display 115 that employs a graphical user interface (GUI) and an input device 117 in addition to having the facility to access other computers, such as server 126. The server 126 has at least one central processing unit (CPU) 108 which typically is the processor for an operating system and an application resident in memory 120 that contains a database storage unit 107 and a means for communication 122. The system 100 may further include a plurality of remote computers (not shown) and further by way of example and not limitation, to a plurality of mobile personal data assistants, tablets and smartphones (not shown) that may access the server 126 and operate the processes disclosed herein.

The system 102 may be configured in many different ways. For example, server 126 may be a conventional standalone server computer or alternatively, the function of server may be distributed across multiple computing systems and architectures. Server 126 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications ports that serve as a communication link with other servers, client or user computers. A variety of communications protocols may be part of the system, including but not limited to: Ethernet, SAP, SAS™, ATP, Bluetooth, GSM and TCP/IP.

Controllers (not shown) reside in CPU 108 and CPU 119 that comprise processors (not shown), such as one or more conventional microprocessors and one or more supplementary co-processors such as math co-processors. In CPU 108 at least one such processor is in communication with a communication module 122 that transmits data over a port through which the communication module 122 communicates with other devices such as other servers, user terminals or devices and the Internet 146. The communication port may include multiple communication channels for simultaneous communication with, for example, other processors, servers or client terminals.

The data storage device 107 may store, for example, (i) a program, (e.g., computer program code and/or a computer program product), for creating, executing and porting the software, as more fully described in FIG. 2, and FIG. 3, to direct the processor in accordance with the present invention, and particularly in accordance with the processes described in detail hereinafter with regard to the creating, executing and porting the software to achieve the novelty of the invention; (ii) a database adapted to store information that may be utilized to store information required by the program for creating, executing and porting the portable software to achieve the novelty of the invention. The program for creating, executing and porting the portable software may be stored, for example, in a compressed, an uncompiled and/or an encrypted format, and may include computer program code. The instructions of the program, included user generated macros that may include instructions to record and playback executable programs may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that provides or participates in providing instructions to the processor of the computing device (or any other processor of a device described herein) for execution and more particularly for creating, executing and porting the portable software. Such a medium may take many forms, including but not limited to, non-volatile media, volatile media, and transmission media. Non-volatile media include, by way of example, optical or magnetic disks, such as memory. Volatile media may include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for creating, executing and porting the portable software. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server, such as communication module 122) can receive the data on the respective communications line and place the data on a system bus for the processor. The instructions received by main memory may optionally be stored in memory either before or after execution by the processor. In addition, instructions may be received via communication module 122 and associated port as electrical, electromagnetic or optical signals, which are exemplary forms of wireless communications or data streams that carry various types of information.

In one embodiment of the invention a computer process enables users (a) to create adapters that enable application automation by collecting automation information; (b) to locate application controls and tracking changes between an older and a newer version of the application, such changes to include addition of one or more new data fields, removal of one or more data fields, change in data field type (i.e., type of data held in the field). The program looks for application controls in every screen of the application that the user exposes to the program. An application control is any field or UI control used to add, remove or change application data or perform actions such as clicking buttons, selecting input from list, as by way of example, indicating yes / no, etc. One non limiting embodiment of this includes a method for generating updated programming content, for an existing application having an adapter in order to operate with a new version of a related application, including the steps of (1) extracting source field data from existing application and target field metadata from the new version of the related application; (2) storing the source field data from existing application and target field metadata from the new version of the related application to a process repository; (3) transforming and transferring the stored data from steps (2) to the adapter; (4) updating the existing adapter to work with the new version of the related application, utilizing the data obtained by the adapter in step (3).

The process of locating application controls includes creating a logical hierarchical representation of each application screen (see FIG. 5B and FIG. 5D), and storing different nodes of this tree, along with key properties of each node in the tree. Further embodiments of the invention herein allow a change of field layout; and a change in the underlying technology framework of the application. An example of changes in underlying technology framework would be an application that was initially developed using .NET framework, could be rewritten using a Java framework, i.e., a high-level programming language developed by Sun Microsystems.

The invention herein also presents application changes using an exception management model to a user, so that the user can, by way of example, provide feedback in a visual, instead of programmatic manner. An exception management model refers to presenting only the differences, i.e. new and modified fields in the application versions to the user. Visual feedback refers to the user selecting the field type from, by way of example, a dropdown menu instead of writing a script referring to a particular data type. The process then stores the changes, so as to make the adapters resilient to application changes and upgrades, as well as incorporating the changes to upgrade the application itself.

Figure 2A:
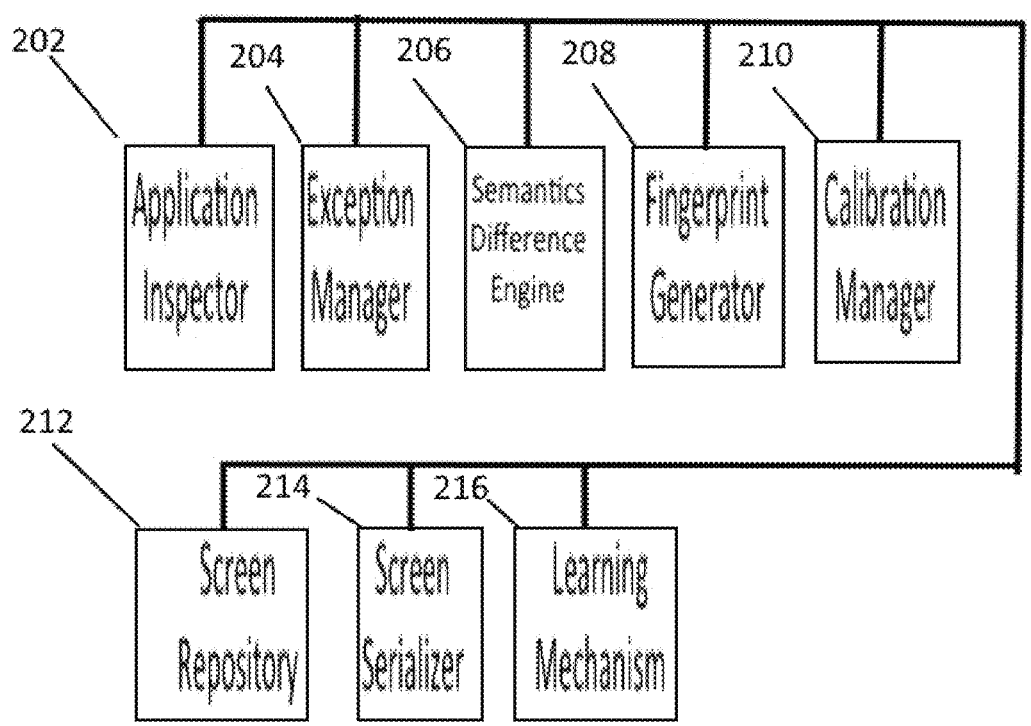
FIG. 2A shows the modules for creating one or more new application execution files in accordance with an embodiment of the present invention.

Referring now to FIG. 2A, a set of modules 202-216 comprises a non limiting embodiment of the invention. These modules include the following functions:

Application Inspector: The application inspector 202 performs an analysis of the application that it is pointed at, and gets information on underlying application framework, object metadata and properties, object type and associated actions, user interface (UI) layout and application response times. This information is critical to automating the application. Examples of these frameworks are found in a Document Object Model (DOM) for a browser, Java framework, .NET framework, SQL and other underlying technologies, all which are well-know by those of ordinary skill in the art of system programming.

Exception Manager: The exception manager 204 filters out mismatched objects between versions of objects that semantically have a high probability of being synonyms, but the actual object properties indicate that object structure has changed significantly. The exception manager then routes these exceptions to an exception queue (not shown), which is then presented to the user to either confirm or remap the objects.

Semantics Difference Engine: The sematic difference engine 206 uses two object hierarchies: a source object and locates the source object in a target hierarchy (see, FIG. 5D). It does this by taking into account the source and target object's labels and inferring its meaning, the context of other fields, and controls within its sphere of activity in a physical layout. The engine 206 assigns weights to label closeness matches, the distance to other known controls and the object structure of the source and the potential target control. The output of engine 206 is a number or other quantifier, that represents a percentage of the probability of a match.

Fingerprint Generator: The fingerprint generator 208 analyzes a screen writer for various objects (markers) and their locations. The combination of various objects, object metadata, properties and types, and location on the screen is used to generate a unique set of keys that can together represent a "fingerprint" of that screen that assists the automation application, as disclosed in U.S. Pat. No. 8,504,803, System and Method For Creating and Executing Portable Software, to recognize that specific screen, among a set of any other possible screens.

Calibration Manager: The calibration manager 210 compares and analyzes similar functional screens from different versions of an application. It uses a variety of methods to perform the comparison, i.e. compare screen fingerprints, perform an application inspection and incorporate user input. It presents the results in a graphical user interface that allows a user to categorize application objects as common, new or deleted. Based on fingerprinting information the calibration manager offers recommendations on field mapping. Users can follow the calibration manager's recommendations or override as needed.

Screen Repository: The screen repository 212 represents a set of screens deemed by the user to be essential to carrying out selected business process from a screen collection. Multiple collections created by the user comprise a screen repository.

Screen Serializer: The screen serializer 214 is a program to store screens and related metadata and to control structure in a machine readable format.

Learning Mechanism: The learning mechanism 216 program is utilized to build an upgraded resilient automation adapter that the system utilizes to timely store and mine features of an underlying application technology and object recognition criteria, and to learn critical identifying criteria, for the purpose of applying it to automate the applications that it may be updating. The learning mechanism includes filing information under appropriate categories, applying machine learning techniques, as by way of example and not limitation, multiple regression, principal component analysis, and storing the results in a knowledge database. This knowledge database is then utilized to identify underlying technologies and object recognition criteria for any new application that the automation application encounters.

Figure 2B:
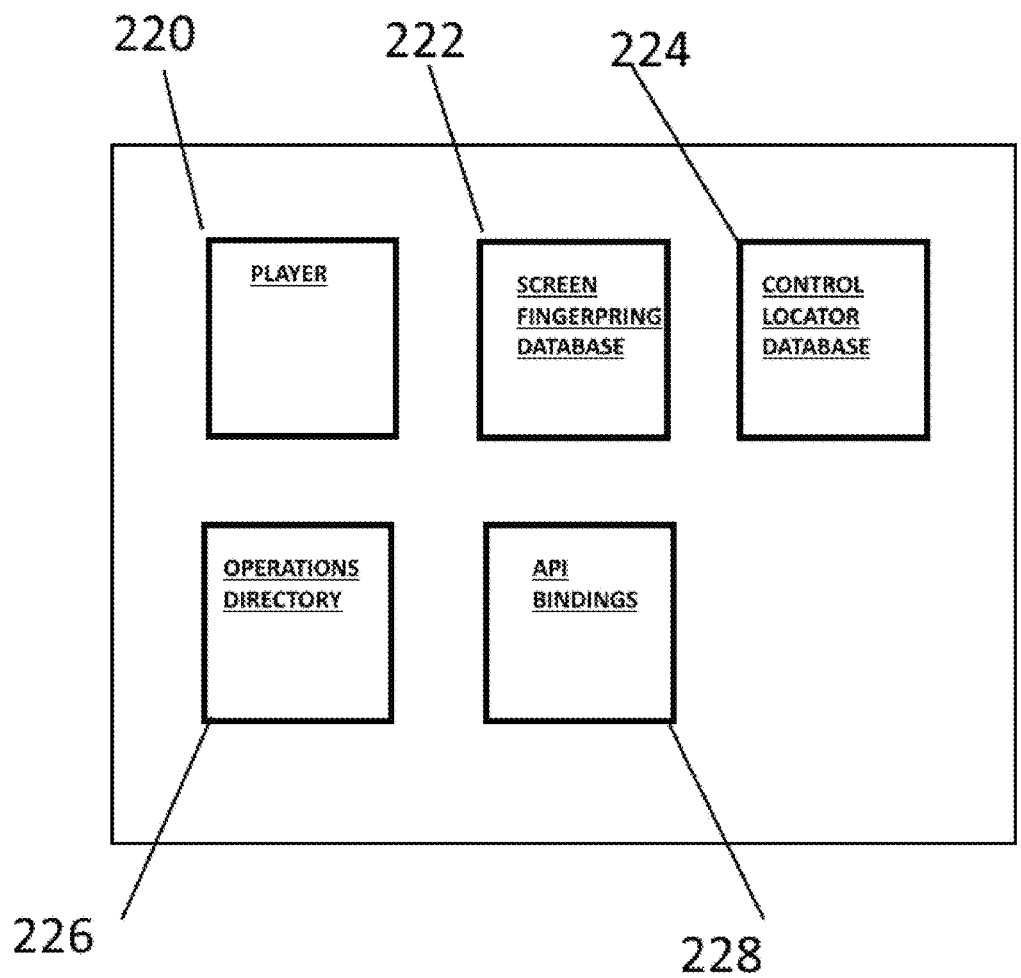
FIG. 2B shows a diagram for an adapter as generated, in accordance with an embodiment of the present invention.

FIG. 2B illustrates a non limiting example of a hypothetical adapter data module, for use in a process FIG. 3, 300, as further described below. It includes the application player 220, a screen fingerprinting database reference 222, a control locator database reference 224, an operations directory 226 and an API bindings 228. Those of ordinary skill in the art of object programming applications will appreciate the significance of the generation of the adapter parameters and data modules depicted in FIG. 2B.

Figure 3:
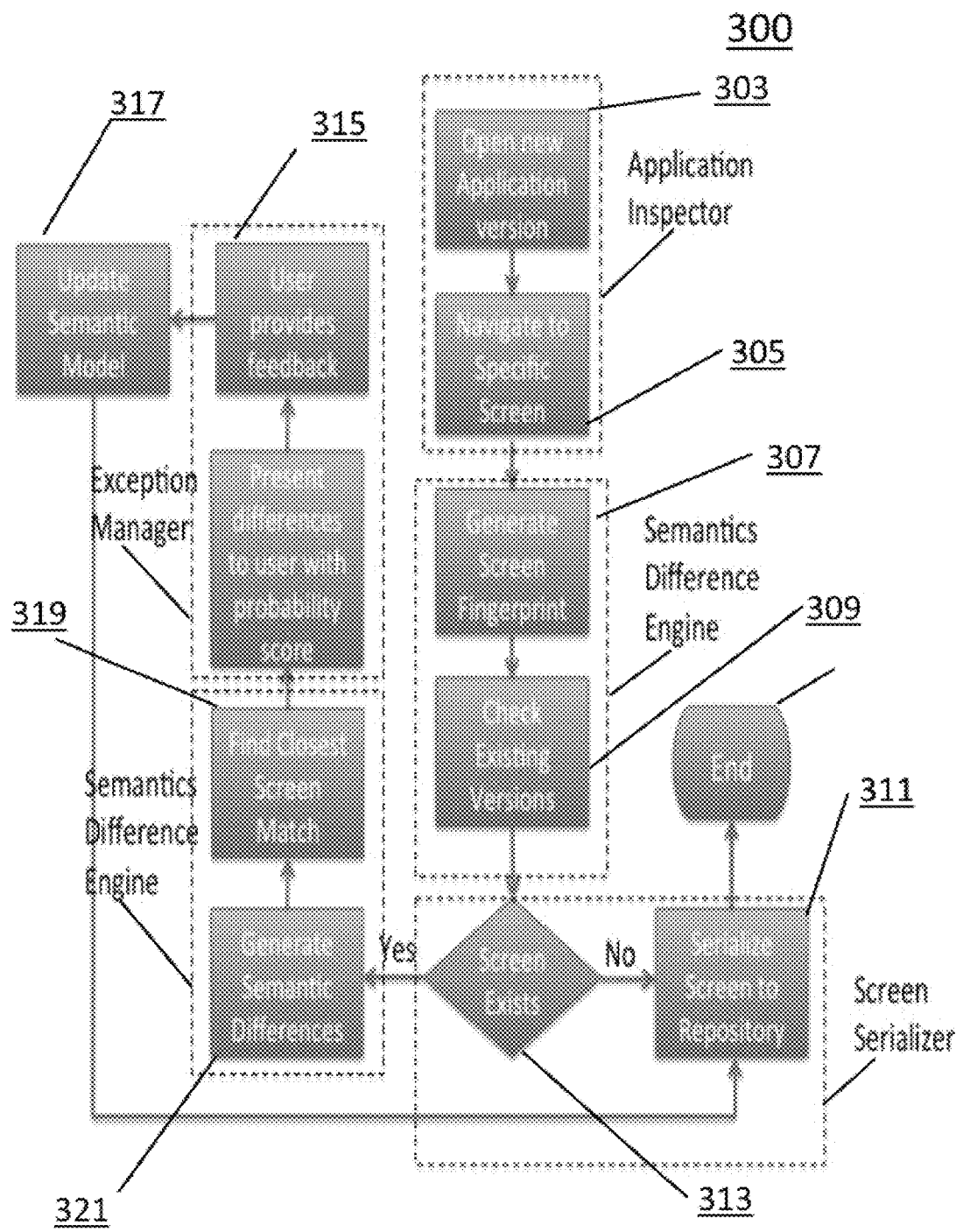
FIG. 3 shows a flow diagram for creating one or more new application execution files, in accordance with an embodiment of the present invention.

With further reference to FIG. 1, and FIG. 3, and by way of example and not limitation, a user of the system 100 (FIG. 1) may desire to create a process 300 instantiated as a task to be run at various times or repetitively on the local computer 104 to achieve the foregoing objects. In a browser, viewed by the user in display 115, process 300 will permit the user to insert commands having single execution features or as part of a several line operation or one of several commands that may operate as part of a larger loop or nested loop that will have the effect of achieving an outcome having the effect of reflecting updates in earlier version applications. As by way of example a user would achieve the objects of the invention by the following series of operations: (1) Locate candidates for change by control identification ("id"); (2) Determine if a unique control found and control type match exists; (3) Eliminate all candidates with control type !=reference control type; (4) Assign weights to compute match probability; (5) Compute attribute differences for each candidate; (6) Observe if a higher overlap percentage gets a higher weight; (7) Compute reference control path ends with a match in target screen; (8) Determine if a longest path overlap gets higher weights; (9) Locate proximity to neighbors on actual visual placement on screen; (10) Determine if percentage of control types and text labels/id match the reference screen; (11) Eliminate all controls under a probability threshold limit; (12) Present control mapping to user to confirm.

U.S. Pat. No. 8,504,803 entitled System and Method For Creating and Executing Portable Software, incorporated by reference herein, demonstrates the creation of commands having single execution features or as part of a several line operation or one of several commands known as a portable unit that will facilitate the construction of the inventive features of the process 300.

Process 300, which aids the user in carrying out the foregoing operations, begins at step 303, resident in the application inspector FIG. 2A, 202, wherein the user opens a new application version, for example, locating a candidate by control id. A control id typically represents information needed for automating, such as application controls, application objects, their fields and their properties, and integration services. The controls, though not exclusively, are embodied in menu hierarchies, and the arrangement of GUI buttons that serve as menu commands, having textual labels and hierarchical layouts characterized as drop down menus or hotlinks, necessary for operating various programs and applications.

In step 303 the user then navigates to a specific screen 305 in order to generate a screen print 307, which in the particular embodiment disclosed resides in the semantics difference engine, FIG. 2A, 206, working with the fingerprint generator 208. The process step 309 then checks or retrieves an existing version of the application and in step 313 determines if a screen exists. If the screen does not exist the application is serialized 311 for reference and the process 300 is ended 323. If the step 313 determines that a screen exists, then the semantic differences are ascertained in step 312 and an analysis on the differences is performed in step 319 to find the screen's closest match. By way of example, depending on versions of a program, an object may have appeared on a screen different from a later version, and it may be necessary to determine the correct screen to compare, the former and the latter version by extracting system attributes.

In one embodiment, the steps 312 and 319 are performed as part of the semantics difference engine FIG. 2A, 206. The difference found in step 319 and in step 320 presented to the user with a probability score. In step 315 the user provides feedback, such as by way of example and not limitation, what to include in the adapter for the new version. Both steps 320 and 315 are, in the disclosed embodiment, performed in the exception manager, FIG. 2A, 204. The user feedback 315 is used to update the semantic model in step 317. Following that step, the process 300 returns to serialize 311 for reference and the process 300 is ended 323.

Figure 4:
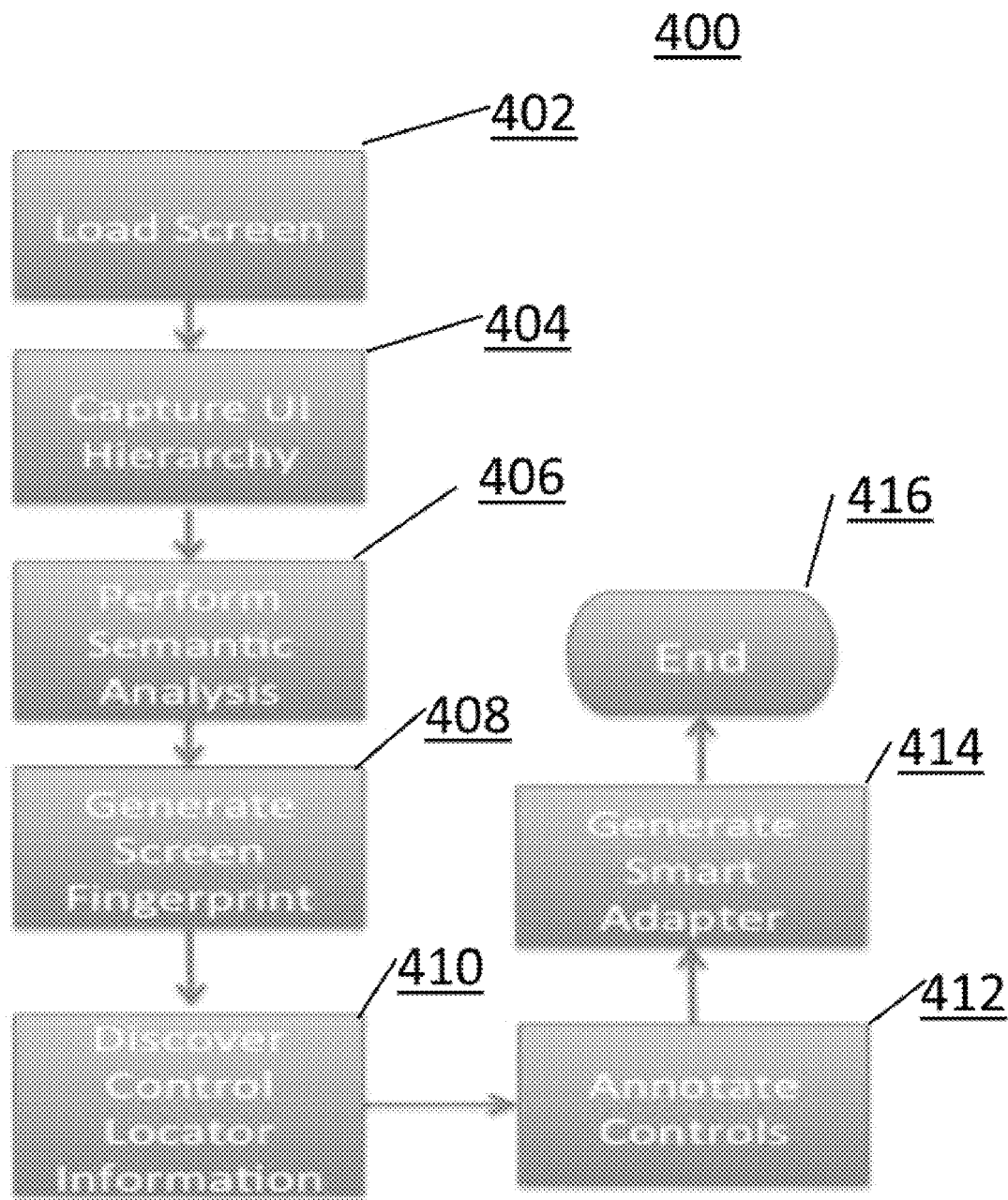
FIG. 4 shows a block diagram for adapter creation, in accordance with an embodiment of the present invention.

In yet another embodiment of the invention FIG. 4 illustrates a block diagram 400 for the creation of an adapter. Block 402 shows loading the screen under examination, which proceeds to capture the UI hierarchy 404 (Also see, FIG. 5B, as more fully described below), for purposes of performing a semantic analysis 406. By way of example, a field type change in one version of an application may be referred to by a different name. In step block 408 a screen print is generated and in block 410 control locator information is determined and stored. The data from 410 is used to annotate the controls 412, and is then sent to block 414 to generate a smart adapter. Block 416 closes out the transaction.

Figure 5A:
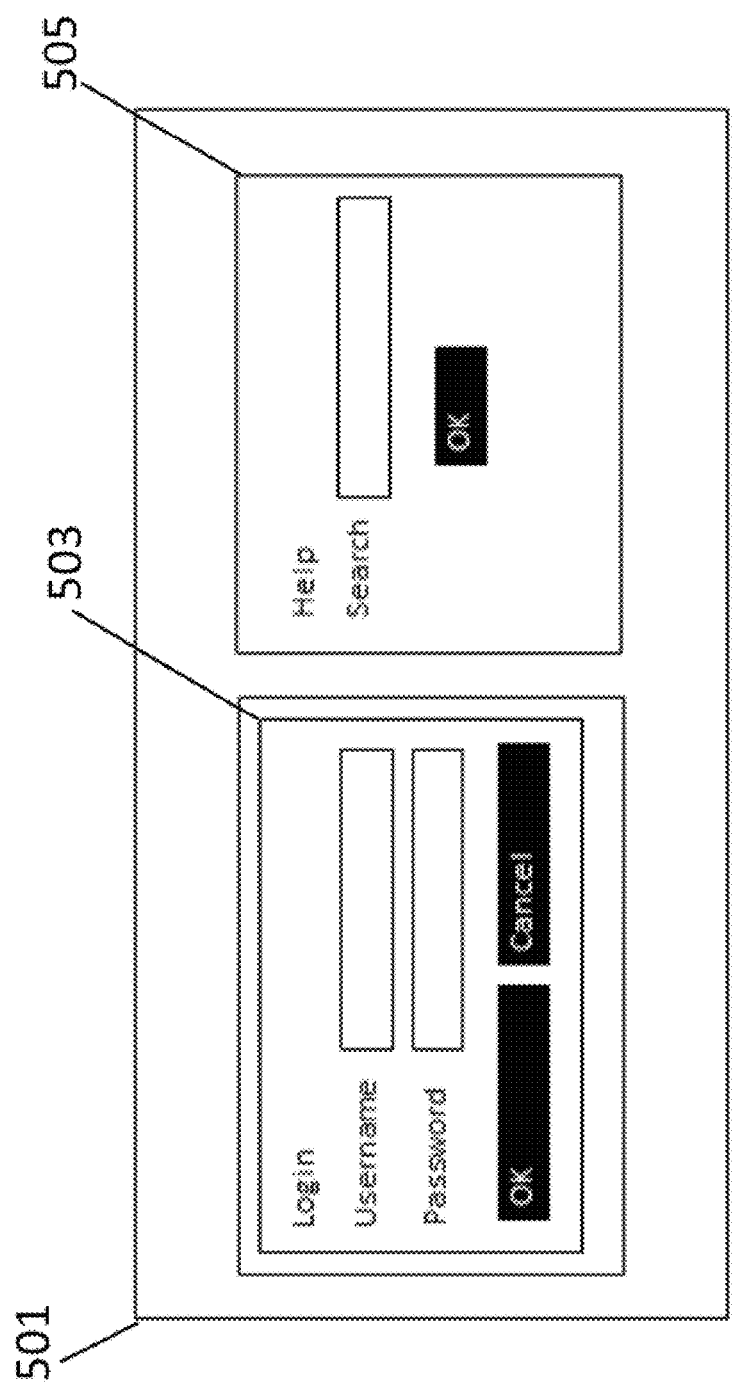
FIG. 5A shows a physical screen of an application, before an upgrade, in accordance with an embodiment of the present invention.
Figure 5B:
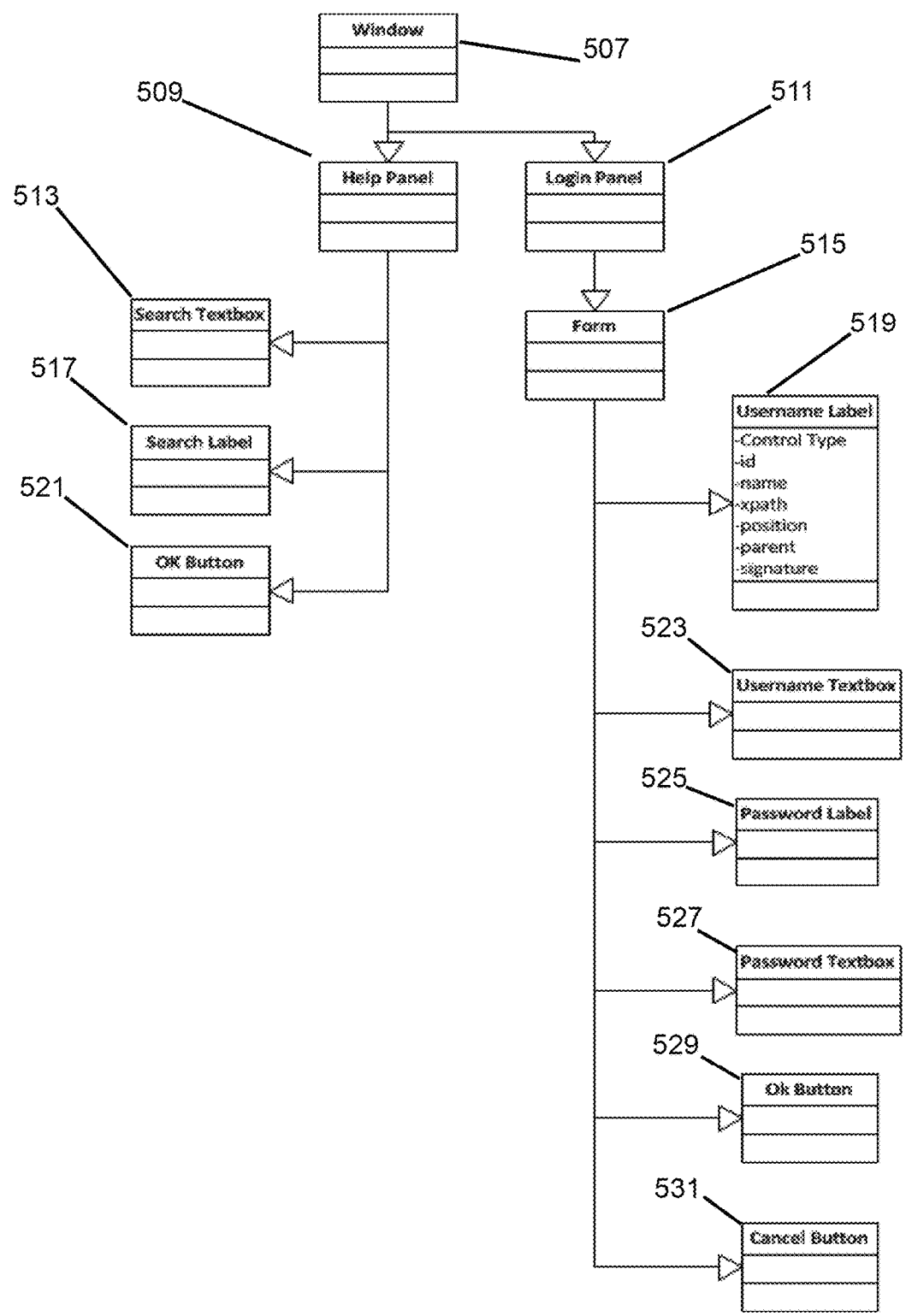
FIG. 5B shows a logical hierarchy of the application in FIG. 5A, before an upgrade, in accordance with an embodiment of the present invention.
Figure 5C:
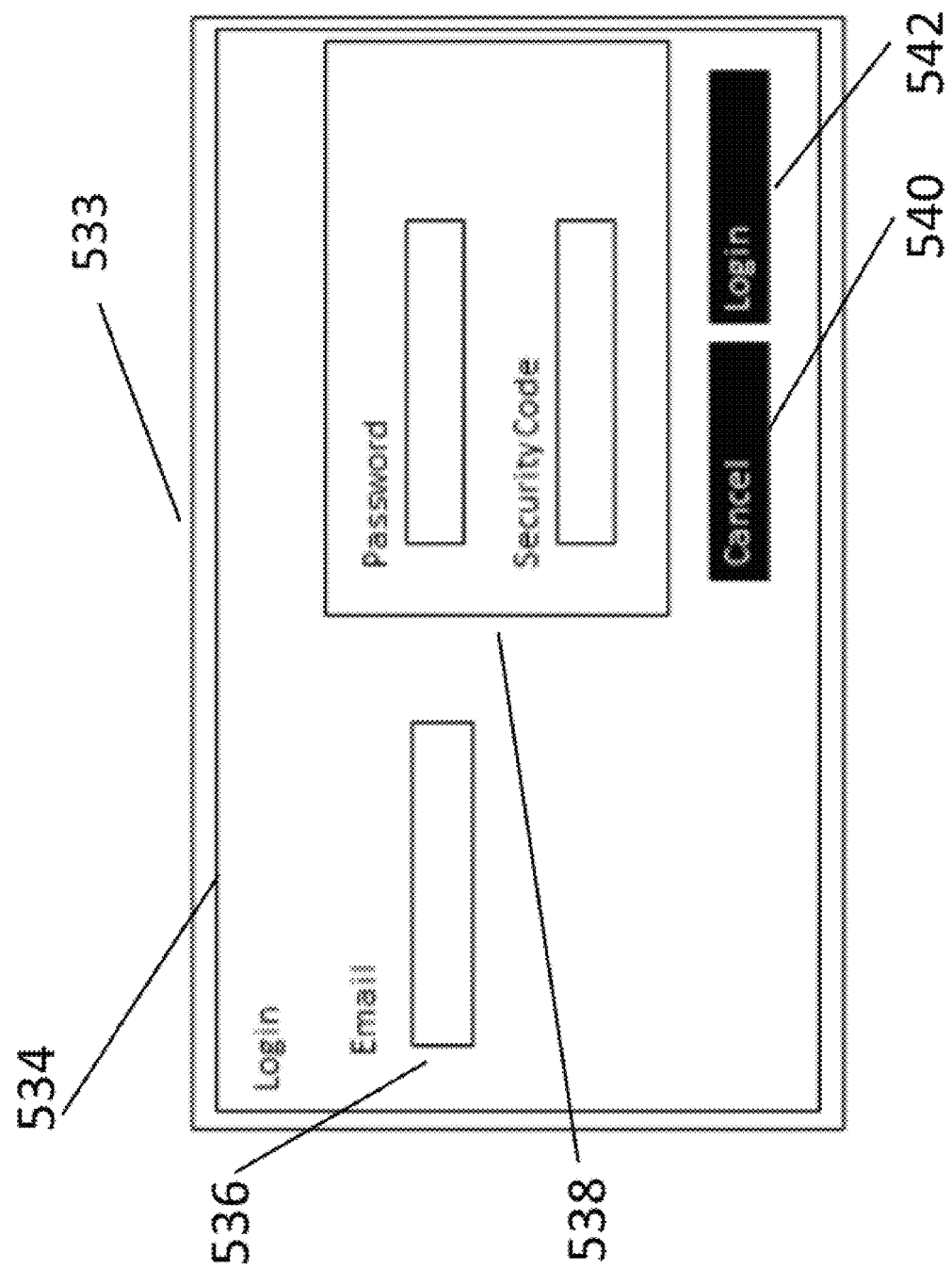
FIG. 5C shows a physical screen of an application after an upgrade, in accordance with an embodiment of the present invention.

FIGS. 5A-D illustrate a non limiting example of an application that has been upgraded using the process 300 as detailed. FIG. 5A shows a GUI screen of an application before an upgrade, while FIG. 5B shows its corresponding logical hierarchy that supports the screen depicted in FIG. 5A. FIG. 5C shows a screen of an application after an upgrade in accordance with an embodiment of the present invention, utilizing process 300 that creates a corresponding revised hierarchy shown in FIG. 5D after an upgrade in accordance with an embodiment of the present invention.

Returning to FIG. 5A, the screen 501 has thereon depicted a non limiting example of images generated by a current version of a hypothetical system, such as a window 503, for logging in, and a window 505 for providing help. FIG. 5B, represents the corresponding logical hierarchy representing the screen 501 (FIG. 5A), having a window 507 that branches into a help panel 509 and a login panel 511. The help panel 509 contains three elements: a search textbox, 513; a search label 517; and an OK button 521. The login panel 511, contains a form 515, which itself contains six elements: a username label 519, having sublabels, as by way of example indicated (control type, id, name, path, position, parent, and signature); a username textbox 523, a password label 525; a password textbox 527; an OK button 529; and a cancel button 531.

Figure 5D:
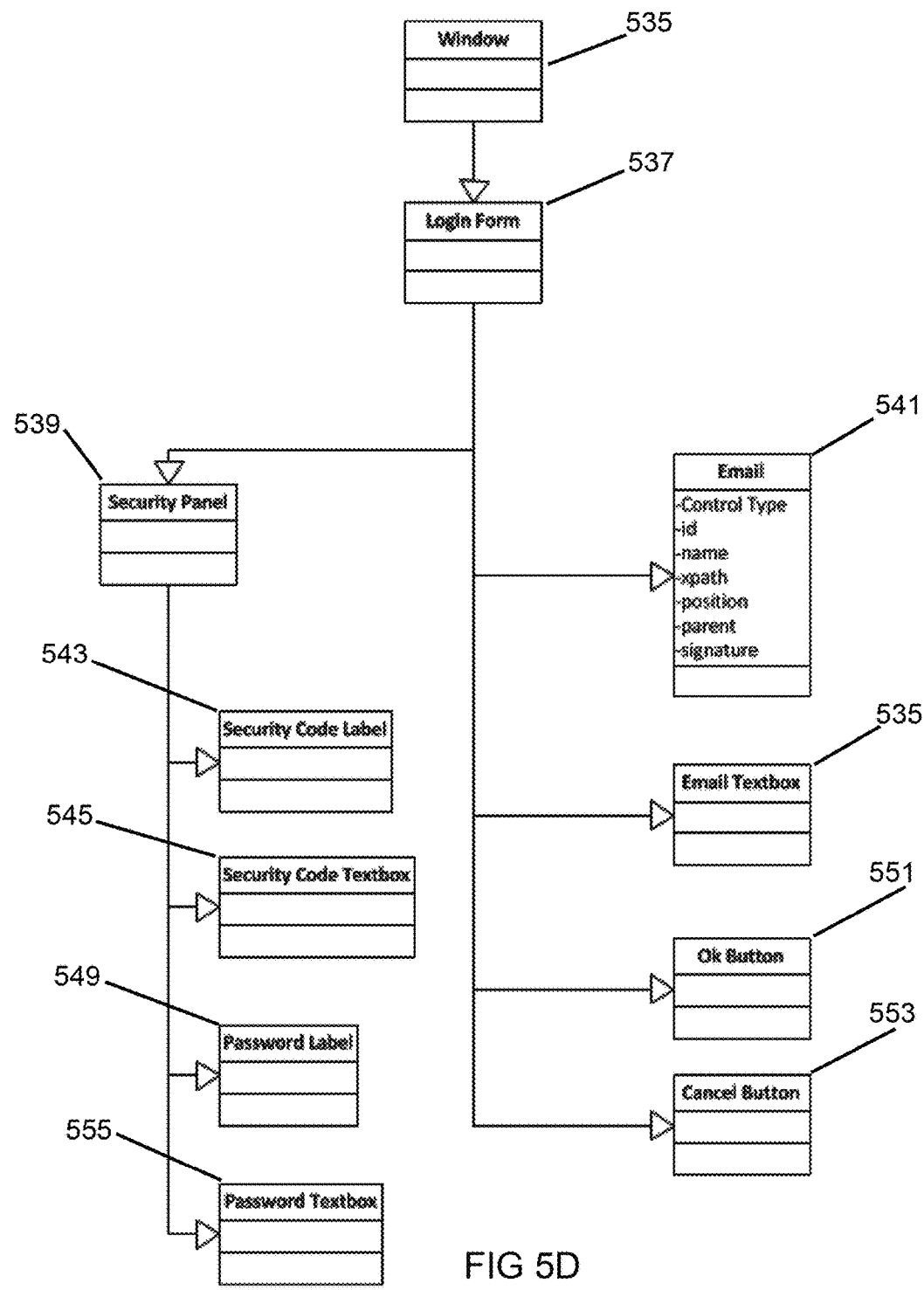
FIG. 5D shows a logical hierarchy of the application in FIG. 5C, after an upgrade, in accordance with an embodiment of the present invention.

Returning to FIG. 5C, GUI screen 533 has thereon depicted images generated by a subsequent or later version of the hypothetical system FIG. 5A. The new version contains a GUI window 534, for logging in, and a box 536 for providing for an Email address; a sub-window 538 providing a box for password and a box for security code. Window 534 includes a cancel button 540 and a login button 542. FIG. 5D, represents the corresponding logical hierarchy representing the screen 533 (FIG. 5C), having a window 536 directed to a login form 537. Login form 537 branches into a security panel 539 and an email 541; email textbox 535; an OK button 551; and a cancel button 553. Each such logical function corresponding to the physical representation in FIG. 5C. The security panel 539 contains four elements: a security code label 543; a security code textbox 545; a password label 549 and a password textbox 555.

FIGS. 6-11, illustrate GUI screens of applications, which are modified according to the process disclosed in accordance with the invention. The screens in FIG. 6 through FIG. 11, are separated into two windows in some instances and three windows in other instances. At least two windows show the before and after of an application. In cases where another window is shown, it typically illustrates the set of parameters undergoing modification.

Figure 6:
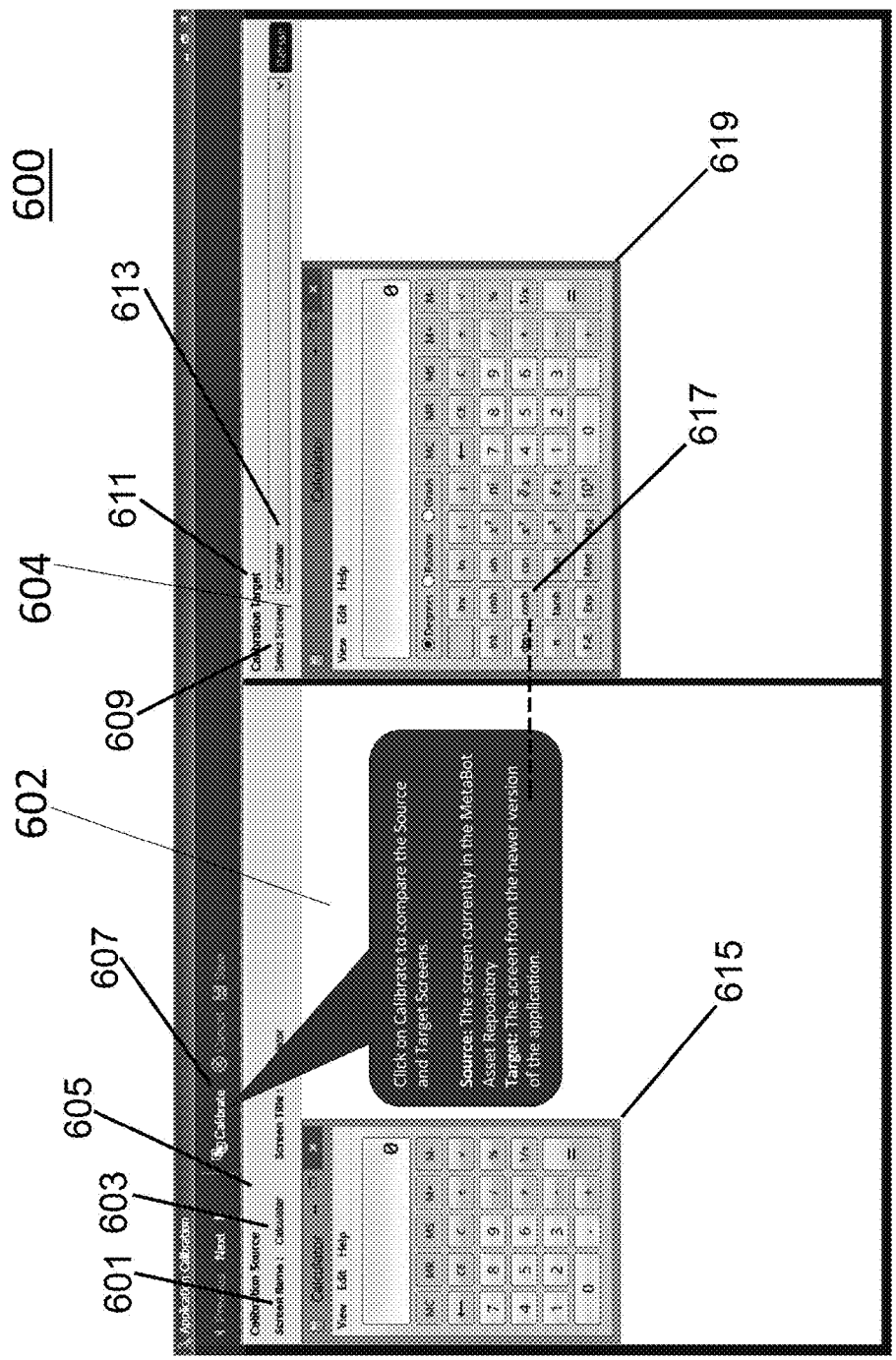
FIG. 6 shows a screen of an application before an upgrade is made and after an upgrade is made, in accordance with an embodiment of the present invention.

FIG. 6 shows a screen 600 divided into a source screen 602 and a target screen 604, which illustrate the before and after screen effects of an upgrade modification to a calculator 615 functionality. A banner 605 generally contains, by way of example, a Screen Name 601, which in the instant example is a Calculator 603 undergoing modification. The Calibrate button 607 allows the user to compare the source screen. In the target screen 604, there is a corresponding banner which in the example, shows a select screen name 609 as Calculator 613. Note that the target screen 604 upgraded calculator 619 contains a multiplicity of new function keys, such as key 617, labeled "cosh."

Figure 7:
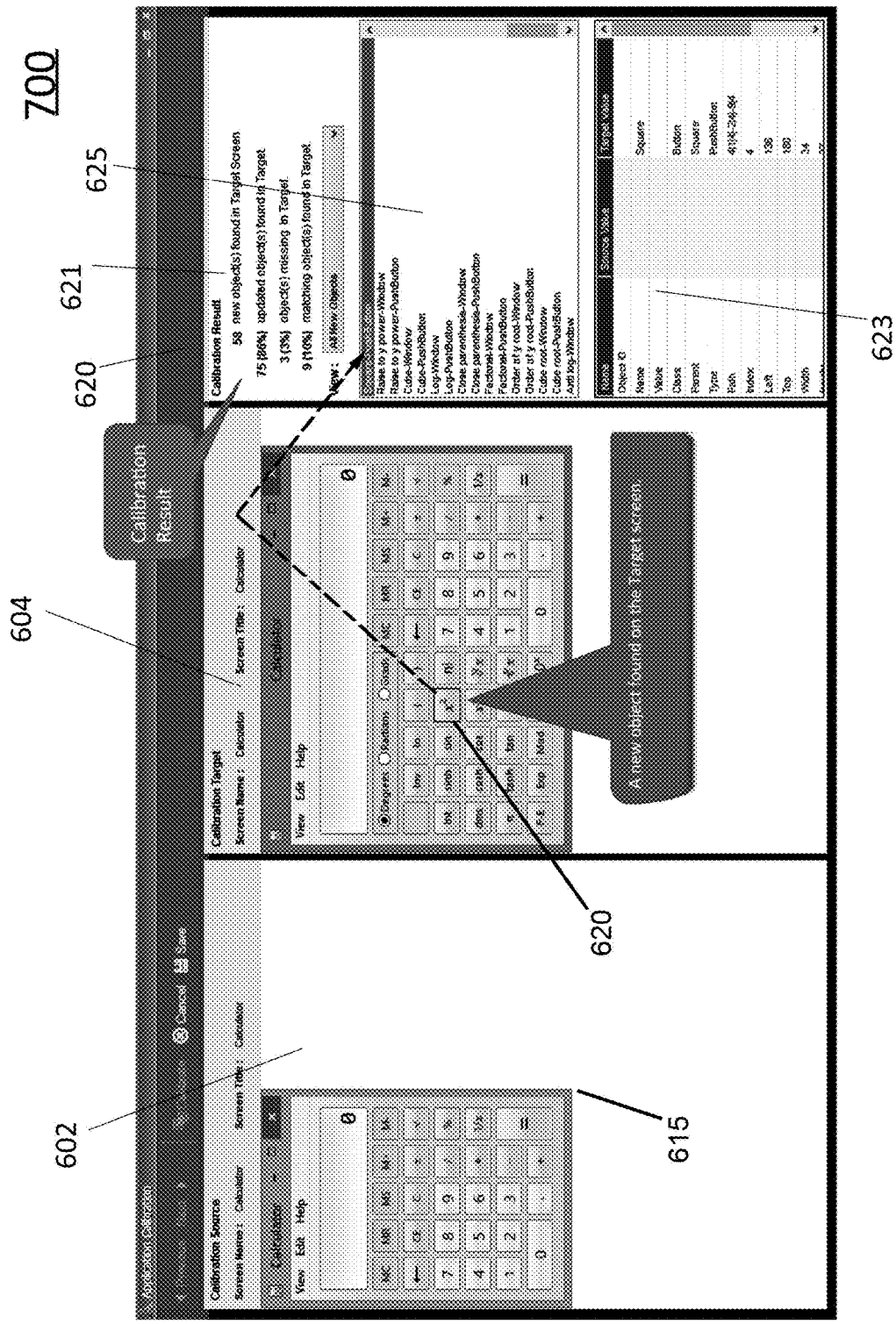
FIG. 7 shows a screen of an application before an upgrade is made and after an upgrade is made, in accordance with an embodiment of the present invention.

FIG. 7 shows a screen 700 with source window 602 and target window 604, and an added window 620, that by way example illustrates in the windows, before and after an upgrade is made, as well as providing additional information in sub-windows 621, 623 and 625. Sub-window 625 displays the types of added function keys that appear in the upgraded calculator. Additionally, a calibration result 621 provides statistical information as to the effect of the change. In the illustrated case, 58 objects are found in the target screen 604. Sub-window 623 displays information pertaining to the particular function "click" in the sub-window 625, which in the example shows the parameters for the "Square-PushButton" $X^2$ in the upgraded calculator.

Figure 8:
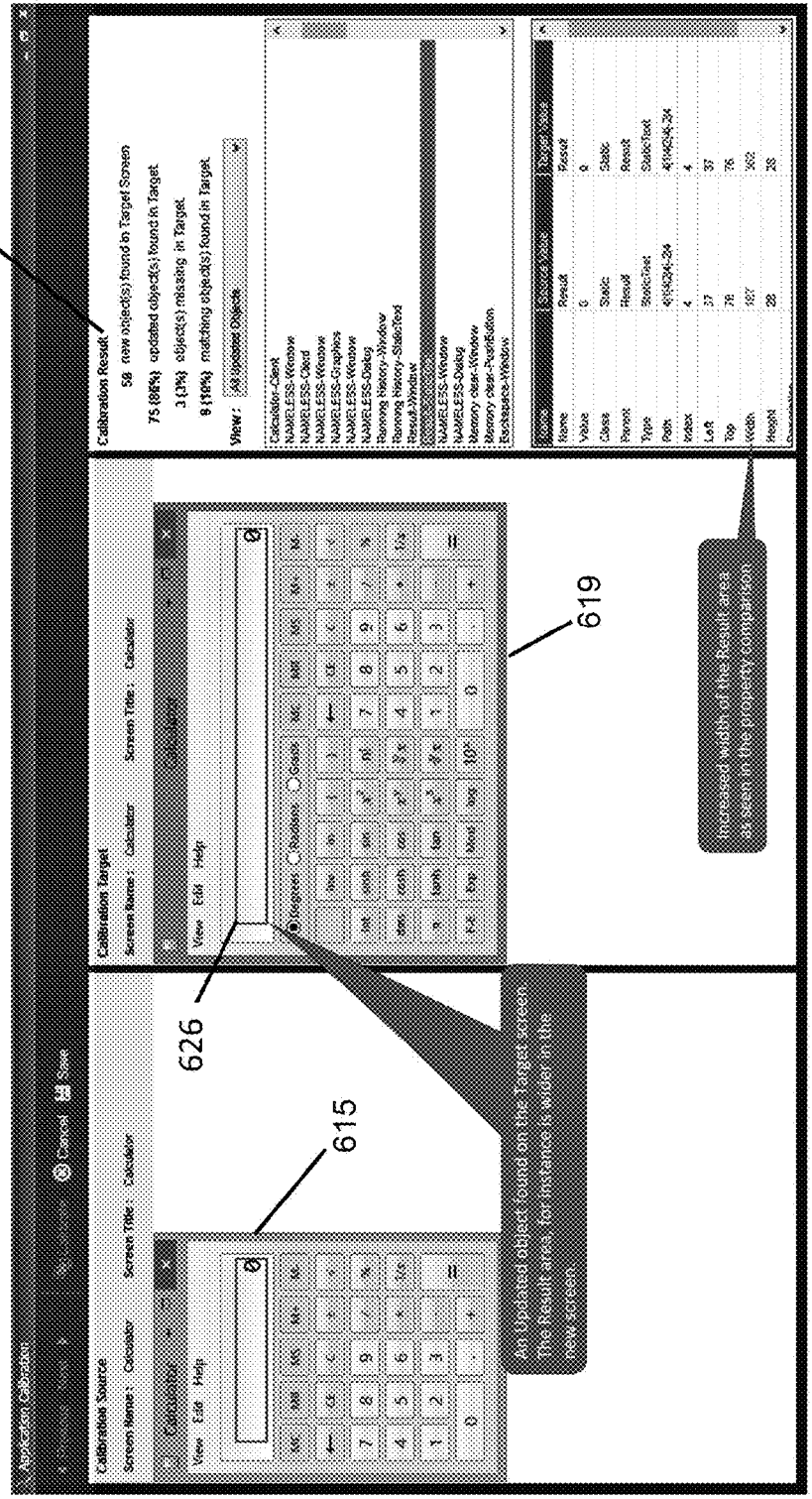
FIG. 8 shows a screen of an application before an upgrade is made and after an upgrade is made, in accordance with an embodiment of the present invention.

FIG. 8 shows a screen 800 of an example illustrating before and after an upgrade is made to the result area 626, in accordance with an embodiment of the present invention.

Figure 9:
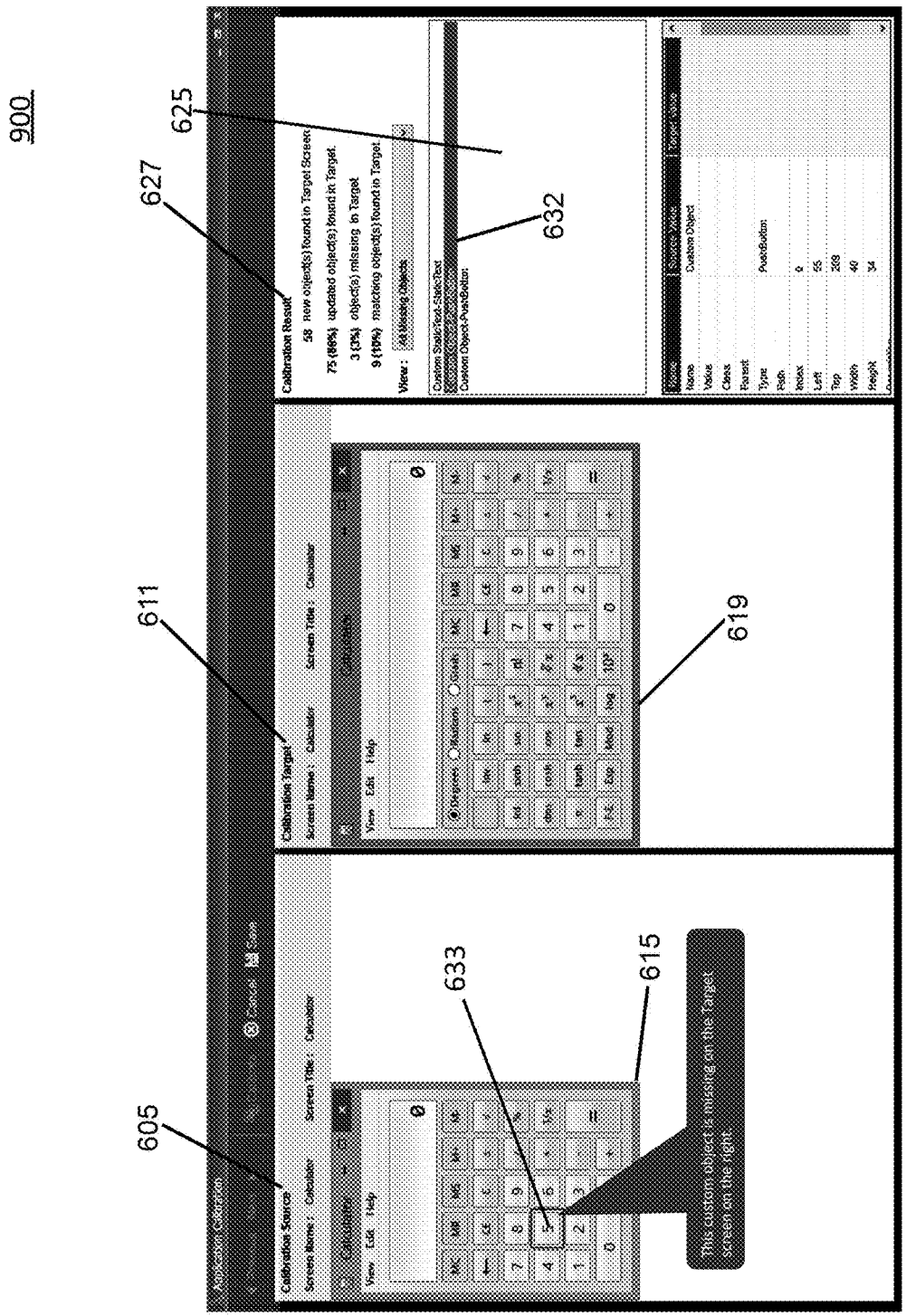
FIG. 9 shows a screen of an application before an upgrade is made and after an upgrade is made, in accordance with an embodiment of the present invention.

FIG. 9 shows a screen 900 of an example illustrating before and after an upgrade is made, where a custom object-pushbutton 633 is missing. It is also noted in the sub-window 625, as "Custom Object-PushButton" 632, in accordance with an embodiment of the present invention.

Figure 10:
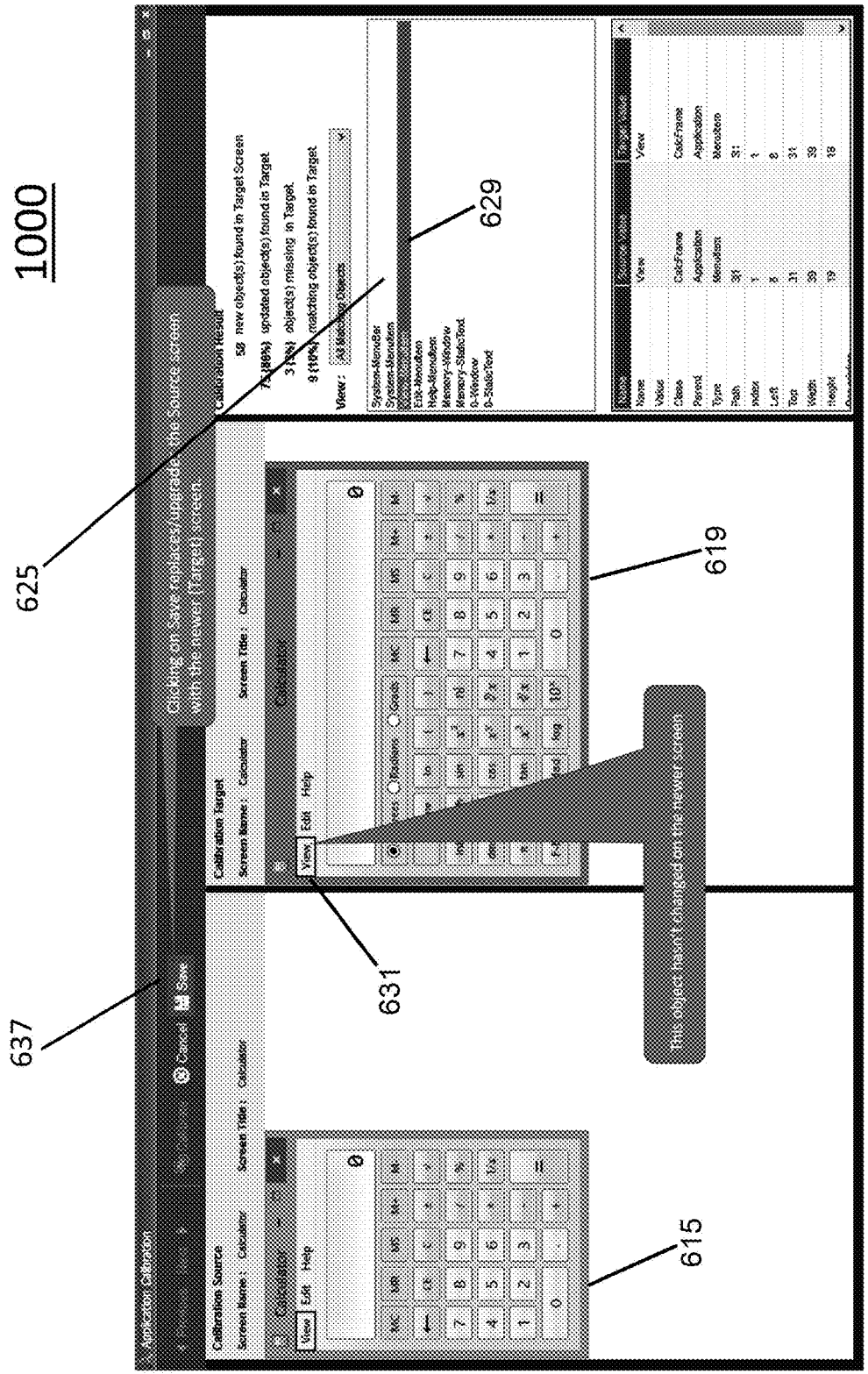
FIG. 10 shows a screen of an application before an upgrade is made and after an upgrade is made, in accordance with an embodiment of the present invention.

FIG. 10 shows a screen 1000 of an example illustrating before and after an upgrade is made, where a view button 631 has not changed on the target screen 619, and it is noted in the sub-window 625, as "View Menuitem" 629. Clicking on the Save 637 button, replaces or upgrades the source screen 602 with the newer target window such as 604 (FIG. 7) in accordance with an embodiment of the present invention.

While the foregoing invention has been described with reference to the above embodiments, additional modifications and changes can be made without departing from the spirit of the invention.

We claim:

1. A computer system for creating adapters that enable application automation comprising:
    (1) a portable unit in a first computer environment having one or more single execution features, several commands, or user generated macros to record and playback executable programs in one or more remote computers;
    (2) an inspector to perform an analysis of an application and retrieve information on at least one of an underlying application framework, object metadata and properties, object type, associated actions, user interface layout and application response time;
    (3) an exception manager to filter out (a) mismatched objects between versions of objects that semantically have a high probability of being synonyms and (b) one or more object properties that indicate that an object structure has changed;
    (4) a semantic difference engine that locates a source object in a target hierarchy by taking into account labels in the source object and labels in a target object and inferring meaning of the labels in the source object and the target object, and further by inferring meaning of context of other fields, and controls within a sphere of activity of the labels in the source object and labels in the target object;
    (5) a fingerprint generator to analyze (a) a screen writer for objects and (b) respective locations;
    (6) a calibration manager to compare and analyze similar functional screens from different versions of an application;
    (7) a screen repository to represent a set of screens to carry out selected business process;
    (8) a screen serializer to store screen, related metadata and control structure in a machine readable format; and
    (9) a learning mechanism to build an upgraded resilient automation adapter for (a) storing and mining features of an underlying application technology and object recognition criteria, and (b) learning critical identifying criteria for applying automated application updates, and including (i) filing information under appropriate categories, (ii) applying machine learning techniques, such as multiple regression, principal component analysis, and (iii) storing the results in a knowledge database.

2. The system recited in claim 1, wherein the learning mechanism includes one or more of the following processes: (a) filing information under appropriate categories, (b) applying machine learning techniques, (c) storing results in a knowledge database, (d) applying the knowledge base results to identify underlying technologies and object recognition criteria to any new application that the automation application adapter encounters.

3. A computerized method operable in a computer system to upgrade one or more remote computers using adapters comprising the steps of:
1. creating a portable unit in a first computer environment having one or more single execution features, several commands, or user generated macros to record and playback executable programs in one or more remote computers;
2. porting the portable unit to the one or more remote computers;
3. executing the portable unit in the one or more remote computers for:
   A. collecting automation information related to an application stored on the one or more remote computers, said automation information including; (1) a control identification, representing information for application controls, that comprise a field or UI control used to add, remove or change application data or perform actions comprising clicking buttons or selecting one or more inputs from a list, application objects, fields and data properties; (2) changes between an older and a newer version of the application;
   B. locating within the control identification one or more candidates for updating the adapter in one or more remote computers;
   C. determining if a unique control exists within a degree of probability and if a control type exists, then assigning a weight based upon the probability, wherein determining if a unique control exists within a degree of probability is performed by a semantic difference engine that locates a source object in a target hierarchy by taking into account labels in the source object and labels in a target object and inferring meaning of the labels in the source object and the target object, and further by inferring meaning of context of other fields, and controls within a sphere of activity of the labels in the source object and labels in the target object;
   D. computing attribute differences for each candidate located;
   E. computing a reference control path end with a match in a target screen;
   F. determining if a longest path overlap weight increases;
   G. locating a proximity of the candidates to neighboring candidates based on a visual presentation on a graphical user interface on a first computer;
   H. determining if a percentage of the control identifications match a reference screen;
   I. eliminating all controls under a probability threshold; and
   J. changing data field type, field layout, and underlying application technology framework.

4. The method of claim 3, further including eliminating all candidates with a selected reference control type.

5. The method of claim 3, further including observing if a higher overlap percentage gets a higher weight.

6. The method of claim 3, further including locating proximity to neighbors on actual visual placement on a screen.

7. The method of claim 3, further including determining if a percentage of control types and labels match a reference screen.

8. The method of claim 3, further including eliminating all controls under a probability threshold limit.

9. The method of claim 3, further including presenting control mapping to a user to confirm.

10. The method of claim 3, further including creating adapters that enable the computer system to execute steps comprising: (1) opening a new application related to an existing application; (2) navigating to a specific display screen; (3) generating a screen fingerprint of the existing application; (4) checking existing versions; (5) determining if the screen exists and if (a) the screen does not exist, then (6) serializing the screen for storing into a repository and then exiting; otherwise if (b) the screen exists, then (7) generating semantic differences between the new application and the existing application; (8) finding closest screen match; (9) presenting differences to a user with a probability score dependent on the differences; (10) providing feedback from a user; (11) updating a semantic model; (12) serializing the screen repository.

11. A non-transitory computer-readable medium having stored thereon computer-readable instructions for:
   A. executing one or more programs on one or more local or remote computers, said programs identifying one or more data relationships that exist between and utilized by one or more applications resident on one or more local or remote computers;
   B. employing in a first computer, remote access technology to access and update software on one or more remote computers and creating one or more automation profiles for execution in one or more remote computers;
   C. (1) collecting automation information related to an application stored on the one or more remote computers, said information including (1) a control identification, representing information for application controls, application objects, fields and data properties; (2) changes between an older and a newer version of the application;
   D. locating within the control identification one or more candidates for updating the one or more remote computers;
   E. determining if a unique application control, that comprises a field or UI control used to add, remove or change application data or perform actions comprising clicking buttons or selecting one or more inputs from a list, exists within a degree of probability and if a unique application control exists, then assigning a weight based upon the probability, wherein determining if a unique application control exists within a degree of probability is performed by a semantic difference engine that locates a source object in a target hierarchy by taking into account labels in the source object and labels in a target object and inferring meaning of the labels in the source object and the target object, and further by inferring meaning of context of other fields, and application controls within a sphere of activity of the labels in the source object and labels in the target object;
   F. computing attribute differences for each candidate located;

G. computing a reference control path end with a match in a target screen;
H. determining if a longest path overlap weight increases;
I. locating a proximity of the candidates to neighboring candidates based on a visual presentation on a graphical user interface on a first computer;
J. determining if a percentage of the control identifications match a reference screen;
K. eliminating all controls under a probability threshold; and
L. changing data field type, field layout, and underlying application technology framework.

* * * * *